US008343256B2

(12) United States Patent
Lines et al.

(10) Patent No.: US 8,343,256 B2
(45) Date of Patent: Jan. 1, 2013

(54) INTEGRATED CONTAMINANT SEPARATOR AND WATER-CONTROL LOOP FOR A FUEL REACTANT STREAM

(75) Inventors: Michael T. Lines, South Windsor, CT (US); Derek W. Hildreth, Manchester, CT (US); John L. Preston, Jr., Hebron, CT (US)

(73) Assignee: UTC Power Corporation, South Windsor, CT (US)

( * ) Notice: Subject to any disclaimer, the term of this patent is extended or adjusted under 35 U.S.C. 154(b) by 407 days.

(21) Appl. No.: 12/734,863

(22) PCT Filed: Dec. 27, 2007

(86) PCT No.: PCT/US2007/026342
§ 371 (c)(1),
(2), (4) Date: May 27, 2010

(87) PCT Pub. No.: WO2009/085029
PCT Pub. Date: Jul. 9, 2009

(65) Prior Publication Data
US 2010/0304231 A1 Dec. 2, 2010

(51) Int. Cl.
*B01D 53/14* (2006.01)
(52) U.S. Cl. ......... 95/16; 95/17; 95/18; 95/196; 95/205; 95/211; 95/232; 429/410
(58) Field of Classification Search .............. 429/17, 429/19–20, 30, 33–34, 410; 423/243.01, 423/210, 650, 651
See application file for complete search history.

(56) References Cited

U.S. PATENT DOCUMENTS

| | | | |
|---|---|---|---|
| 4,307,067 A * | 12/1981 | Tagawa et al. | 423/224 |
| 4,801,356 A | 1/1989 | Grasso | |
| 4,917,874 A * | 4/1990 | Sheth et al. | 423/242.7 |
| 6,376,114 B1 * | 4/2002 | Bonville et al. | 429/425 |
| 6,979,505 B2 * | 12/2005 | Grasso et al. | 429/411 |
| 7,033,557 B2 * | 4/2006 | Grasso et al. | 423/243.01 |
| 7,628,847 B2 * | 12/2009 | Pope et al. | 96/242 |
| 7,682,425 B2 * | 3/2010 | Niehues et al. | 95/199 |
| 2007/0119153 A1 * | 5/2007 | Pierz et al. | 60/286 |

FOREIGN PATENT DOCUMENTS

KR 2007061498 A * 6/2007
KR 2007061498 A * 6/2007

* cited by examiner

*Primary Examiner* — Duane Smith
*Assistant Examiner* — Ives Wu
(74) *Attorney, Agent, or Firm* — Malcolm J. Chisholm, Jr.

(57) ABSTRACT

An integrated contaminant separator and water-control loop (10) decontaminates a fuel reactant stream of a fuel cell (12). Water passes over surfaces of an ammonia dissolving means (61) within a separator scrubber (58) while the fuel reactant stream simultaneously passes over the surfaces to dissolve contaminants from the fuel reactant stream into the water. An accumulator (68) collects the separated contaminant stream, and ion exchange material (69) integrated within the accumulator removes contaminants from the stream. A water-control pump (84) directs flow of a de-contaminated water stream from the accumulator (68) through a water-control loop (78) having a heat exchanger (86) and back onto the scrubber (58) to flow over the packed bed (62). Separating contaminants from the fuel reactant stream and then isolating and concentrating the separated contaminants within the ion exchange material (69) minimizes cost and maintenance requirements.

4 Claims, 2 Drawing Sheets

US 8,343,256 B2

INTEGRATED CONTAMINANT SEPARATOR AND WATER-CONTROL LOOP FOR A FUEL REACTANT STREAM

TECHNICAL FIELD

The present disclosure relates to fuel cells that are suited for usage in transportation vehicles, portable power plants, or as stationary power plants, and the disclosure especially relates to a contaminant removal system for efficiently removing contaminants such as ammonia from a fuel reactant stream passing into a fuel cell.

BACKGROUND ART

Fuel cells are well known and are commonly used to produce electrical current from hydrogen containing reducing fluid fuel and oxygen containing oxidant reactant streams to power electrical apparatus such as transportation vehicles. In fuel cells of the prior art, it is well known that fuel is produced by a reformer and the resulting fuel is referred to as a reformate fuel that flows from the reformer through a fuel reactant stream inlet line into an anode flow field of the fuel cell. As is well known an oxygen rich reactant simultaneously flows through a cathode flow field of the fuel cell to produce electricity. Unfortunately, such reformate fuels frequently contain contaminants especially ammonia. The presence of ammonia in the reformate fuel stream is detrimental to the performance of the fuel cell. It is understood that ammonia is a common byproduct of the reforming process and although the reforming process is designed to minimize formation of ammonia, it is common that low levels of ammonia are present in the reformate fuel. The ammonia formation results from nitrogen that is present in natural gas that is fed into the reformer to be reformed into the fuel. Typically nitrogen content is between 2-3 percent but may reach as high as 15 percent in some parts of the world. Known fuel cells that include phosphoric acid as an electrolyte cannot achieve a desired 10 year life with greater than 1-2 percent nitrogen within the natural gas. Additionally, in the case of auto thermal or partial oxidation reformers, nitrogen can also be introduced when air is used as the oxygen source for the reforming process.

Many efforts have been undertaken to remove ammonia and other contaminants from fuel reactant streams of fuel cells. For example, U.S. Pat. No. 4,801,356 that issued on Jan. 31, 1989, to Grasso disclosed an elaborate system for removal of ammonia from fuel cell power plant water. The system of Grasso includes passing cooling water that had been used to cool the reformate fuel through a first steam stripper and a second steam stripper to remove the ammonia contaminant. Although effective, the system of Grasso requires complex and costly strippers and processing of a large volume of fuel cell coolant water.

More recently U.S. Pat. No. 6,376,114, that issued on Apr. 23, 2002 to Bonville, Jr. et al., disclosed another elaborate system for removing ammonia and other contaminants from reformate fuel. The system of Bonville, Jr. et al., includes alternatively a disposable ammonia scrubber, an ammonia scrubbing cool water bed and an ammonia stripping warm water bed, a pair of first and second regenerable scrubbers, or a single regenerable scrubber. Again, while effective the Bonville, Jr. et al system includes elaborate and costly components that require a high level of maintenance to operate the system. Other ammonia and related contaminant removal systems for fuel cells are known in the art. However, none of these provide for efficiently removing ammonia with minimal costs and minimal maintenance requirements. Most known ammonia contaminant removal systems require large components for processing a high volume of fluids, or require high frequency removal and replacement of contaminated filters and/or ion beds, etc.

Consequently, there is a need for a contaminant removal system for a fuel reactant stream that may be operated efficiently for a long period of time without high frequency maintenance.

SUMMARY

The disclosure is directed to an integrated contaminant separator and water-control loop for a fuel reactant stream of a fuel cell. The integrated contaminant separator is a separator scrubber secured in fluid communication with a fuel reactant inlet line of the fuel cell. The scrubber includes a packed bed of high surface area medium disbursed within a scrubber container. A water discharge is secured above the packed bed for discharging water to flow by gravity over the surface area of the medium. A fuel reactant discharge is secured below the packed bed for discharging the fuel reactant to flow upward from the fuel reactant discharge through the packed bed. An accumulator is secured in fluid communication with the packed bed for accumulating water below the packed bed and the accumulator may consist of simply a water accumulation area in the scrubber container below the packed bed and the fuel reactant discharge. An ion exchange material is integrated within the accumulator so that the accumulator serves as a container for the ion exchange material. The accumulator also includes a particle filter adjacent a water outlet of the accumulator. This prevents particles of the ion exchange material from leaving the accumulator. A scrubber fuel outlet is defined within the scrubber container for directing the fuel reactant stream to flow from the scrubber container back into the fuel reactant inlet line and into the fuel cell.

A water-control loop is secured in fluid communication with the separator scrubber, and the water-control loop includes a loop conduit for directing a water stream out of the accumulator of the separator scrubber and eventually back into the separator scrubber. A water-control loop pump is secured in fluid communication with the loop conduit for pumping the water stream through the loop conduit. A heat exchanger is secured in heat exchange relationship with the loop conduit for heating or removing heat from the water stream within the loop conduit. A loop conduit return line is secured in fluid communication between an outlet of the heat exchanger and a water inlet of the separator scrubber for directing flow of the water stream from the heat exchanger back into the separator scrubber to be discharged through the water discharge over the packed bed. In an alternative embodiment, the water control loop may have no heat exchanger, and instead a fuel-control heat exchanger is secured in heat exchange relationship with a fuel reactant inlet line upstream of the separator scrubber for adding thermal energy to or removing thermal energy from fuel reactant passing through the fuel reactant inlet line into the scrubber.

In a further alternative embodiment, the ion exchange material is not located within the accumulator, and instead is secured as an ion exchange bed within a container. The container is secured in fluid communication with the loop conduit. In such an embodiment the particle filter is not needed in the accumulator.

The integrated contaminant separator and water-control loop may also include a controller to sense the temperature and/or moisture content of the fuel reactant stream leaving the separator scrubber to control the heat exchanger and loop pump to achieve optimal temperatures of the water cycling through the water-control loop to thereby control both or either of the temperature and moisture content of the fuel reactant stream leaving the separator scrubber and passing into the fuel cell. The loop pump and heat exchanger may be controlled and/or set to achieve a balance between the heat transfer from the fuel reactant stream to the water within the separator scrubber and a desired level of ammonia removal from the fuel reactant stream. Ammonia removal also depends upon the solubility of the ammonia in the water. Therefore, the temperature of the water passing through the separator scrubber may be controlled to facilitate achieving optimal ammonia removal and optimal heat transfer from the hot fuel passing from the reformer through the separator scrubber and into the fuel cell.

By the integrated contaminant separator having ion exchange material within and supported by the accumulator, a necessary volume of ion exchange material within the accumulator may be established based upon anticipated operating criteria to achieve replacement of the ion exchange material at desired, predetermined intervals. The ion exchange material may simply be removed and replaced by flushing the combined accumulator water and ion exchange material out of the separator scrubber during shut down of the fuel cell. By integrating the ion exchange material within the accumulator in the scrubber, the disclosure eliminates materials necessary for an ion exchange bed exterior to the separator. Such materials include a separate bottle or other container for the ion exchange material, and the plumbing, fittings and related materials. The integrated separator also eliminates the cost of assembly-labor associated with assembling and installing an exterior ion exchange bed. Also, addition of the ion exchange material to the accumulator increases the viscosity of the combined ion exchange material and liquid separated contaminant stream within the accumulator. Increasing the viscosity reduces production of waves at a surface of the material caused by falling droplets of separated contaminant stream into the accumulator. Reducing the waves has a beneficial effect of minimizing unnecessary triggering of any control switches adjacent the surface of the combined ion exchange material and separated contaminant stream within the accumulator, such as switches necessary to control replenishment and/or overflow of the accumulator.

To achieve such performance with decontamination systems of the prior art, either a much larger, more costly and more complicated scrubber and/or ion exchange bed would be required or replacement of an ion exchange bed or other contaminant isolation apparatus would be required at much more frequent intervals. The present disclosure isolates the contaminants within an ion exchange bed that is separated from all other power plant water systems, such as a fuel reformer system, so that only ammonia has to be removed from the water. Therefore, the contaminant removal system of the present disclosure achieves extremely efficient removal of contaminants within the fuel cell fuel reactant stream and also achieves maintenance of optimal temperature and moisture content of the fuel reactant stream.

Accordingly, it is a general purpose of the present disclosure to provide an integrated contaminant separator and water-control loop for a fuel reactant stream of a fuel cell that overcomes deficiencies of the prior art.

It is a more specific purpose to provide an integrated contaminant separator and water-control loop for a fuel reactant stream of a fuel cell that enhances removal of contaminants from, and maintenance of an optimal temperature and moisture content of, a fuel reactant stream of a fuel cell.

These and other purposes and advantages of the present an integrated contaminant separator and water-control loop for a fuel reactant stream of a fuel cell will become more readily apparent when the following description is read in conjunction with the accompanying drawings.

DESCRIPTION OF THE PREFERRED EMBODIMENTS

Figure 1:
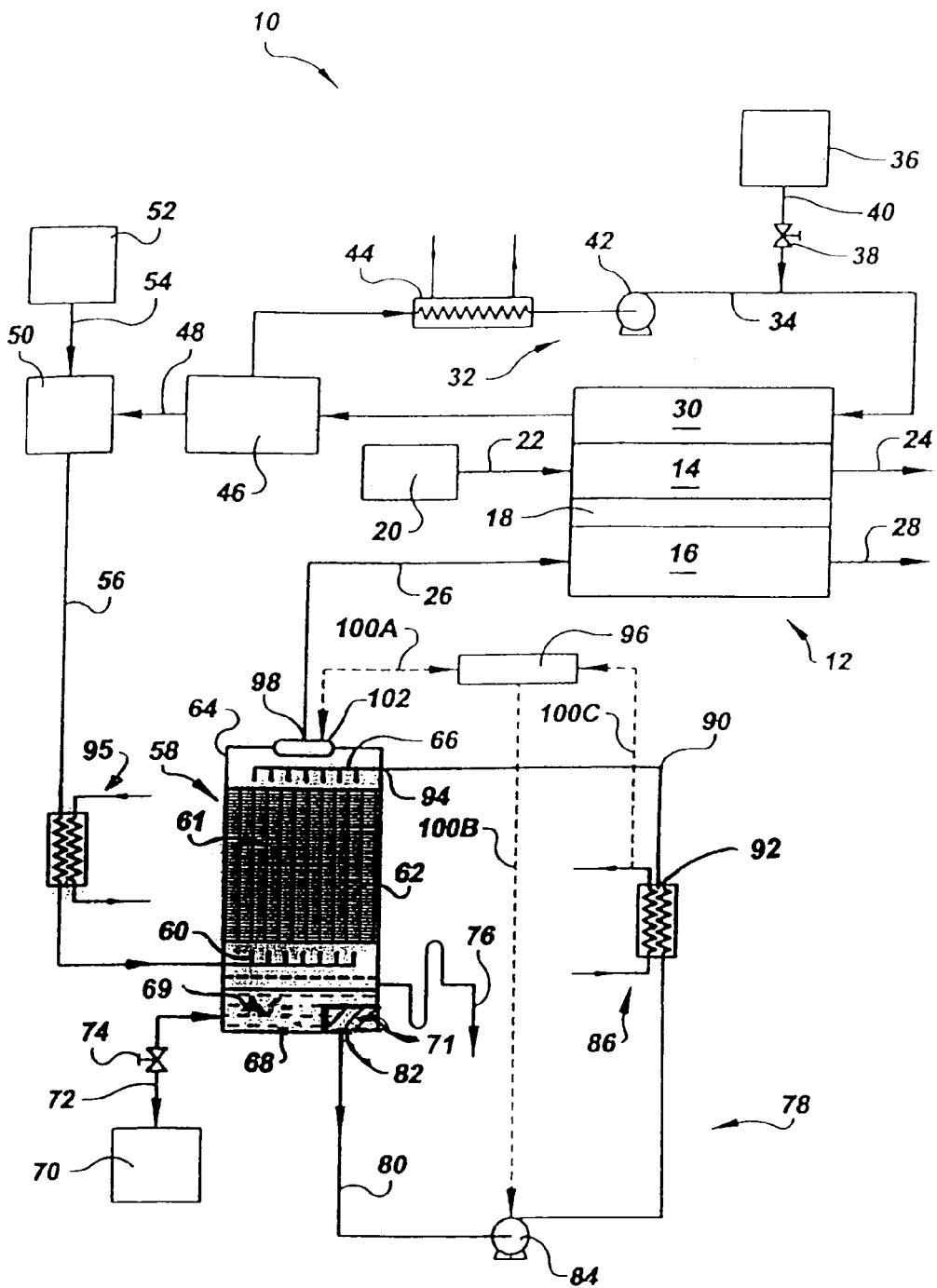
FIG. 1 is a simplified schematic representation of an integrated contaminant separator and water-control loop of the present disclosure.

Referring to the drawings in detail, an integrated contaminant separator and water-control loop for a fuel reactant stream of a fuel cell is shown in FIG. 1 and is generally designated by the reference numeral 10. A fuel cell 12 appropriate for the present disclosure includes a cathode flow field 14 and an anode flow field 16 secured to apposed sides of an electrolyte 18. The electrolyte 18 may be a phosphoric acid electrolyte, a proton exchange membrane ("PEM") electrolyte, or any electrolyte known in the art. An oxygen supply 20 delivers an oxygen containing reactant stream through an oxidant inlet 22 into and through the cathode flow field 14, and the oxygen reactant stream leaves the fuel cell 12 through a cathode vent 24. A hydrogen containing reducing fluid fuel is directed to flow through a fuel reactant inlet line 26 through the anode flow field 16 and out of the fuel cell 12 through anode vent 28.

The fuel cell 12 may also include a coolant plate 30 that has a water-based coolant circulating through the plate 30 by a way of a coolant loop 32. The coolant loop 32 may include a coolant loop conduit 34 that directs the coolant through the coolant loop 32. A coolant supply 36 selectively directs the coolant through a coolant inlet valve 38 and coolant inlet line 40 into the coolant loop conduit 34. A coolant pump 42 is secured in fluid communication with the coolant loop conduit 34 for pumping the coolant through the coolant loop 32. A coolant loop heat exchanger 44 is secured in heat exchange relationship with the coolant loop conduit 34 to control a temperature of the coolant cycling through the coolant loop 34. A steam separator 46 is secured in fluid communication with the coolant loop conduit 34 for separating steam from liquid coolant within the coolant loop conduit 34.

Steam is directed from the steam separator 46 through a steam line 48 into a reformer means 50 for reforming a hydrogen rich fuel, such as natural gas, into a reformate fuel such as hydrogen gas. A hydrogen containing fuel supply 52 directs the fuel through a fuel line 54 into the reformer 50. The fuel supply 52 may be a pressurized supply source, or may include pressurizing means for increasing a pressure of the fuel in a manner known in the art. The reformer 50 may be any reformer means known in the art for reforming hydrogen rich fluids into reformate fuels appropriate for use in fuel cells. The reformer means also includes related components necessary for processing the hydrogen rich fuel into a reformate fuel appropriate for a fuel cell, such as desulfurizers, shift converters, etc.

The reformate fuel leaves the reformer 50 and related components through a first section 56 of the fuel reactant inlet line 26. The fuel then is directed into a contaminant separator scrubber 58 to be discharged through a fuel reactant discharge 60 within the scrubber 58. The separator scrubber 58 includes an ammonia dissolving means 61 for dissolving ammonia from the reformate fuel into a liquid separated contaminant stream within the separator scrubber 58, such as a packed bed 62 of a high surface area medium disposed within a scrubber container 64. Alternative ammonia dissolving structures 62 that may be utilized include open cell foams, unitary integral ceramic foam, honey-comb materials, corrugated materials, steel wool, or wire-mesh structures.

A water discharge 66 is secured above the packed bed 62 for discharging water from the discharge 66 to pass downward by gravity through the packed bed 62. The fuel gas discharge 60 is secured below the packed bed 62 so that the reformate fuel gas discharged through the discharge 60 passes upward through the packed bed 62 as the water is flowing downward through the packed bed 62. As the gaseous fuel passes over and contacts the surface area of the packed bed 62 contaminants within the gaseous fuel are dissolved into solution within the water passing over the surface of the medium within the packed bed 62. Flow through the above described packed bed 62 of the separator scrubber 58 has been described with the flow of the water being downward by force of gravity and the flow of the gaseous fuel being upward, counter to the water flow ("counter-flow"). However, it is to be understood that other configurations of the scrubber 58 within the scope of the disclosure may provide for alternative flow patterns, wherein the water and fuel flow across each other ("cross-flow") and/or in parallel ("co-flow") with each other.

An accumulator 68 is defined within the scrubber container 64 such as below the fuel reactant discharge 60 so that water passing downward through the packed bed 62 is accumulated within the accumulator 68. An ion exchange material 69 is integrated within the accumulator 68, so that the accumulator 68 serves as a container for the ion exchange material 69. The ion exchange material 69 may be any ion exchange means known in the art for removing contaminants from liquid streams, such as a cation exchange resin, and more specifically a hydrogen form cation exchange material would be preferred for removal of ammonia. The accumulator 68 also includes a particle filter device 71 adjacent a water outlet 82 of the accumulator 68. The particle filter device 71 prevents particles of the ion exchange material 69 from leaving the accumulator 68.

A supply of fresh water 70 may be secured in fluid communication with the scrubber container 64 to direct water through a water inlet line 72 and water inlet valve 74 into the scrubber container 64 upon start up or to supplement the scrubber 58 with additional water during operation if a water balance is not maintained. An overflow vent 76 may also be secured to the scrubber container 64 for directing excess water out of the scrubber 58.

A water-control loop 78 is secured in fluid communication with the separator scrubber 58 by way of a loop conduit 80. The loop conduit 80 is secured to the water outlet 82 defined within the scrubber container 64 and in fluid communication with the water within the accumulator 68. The water-control loop 78 also includes a water-control pump device means 84 for pumping a stream of water out of the separator scrubber 58 and through the loop 78. A water-control heat exchanger 86 is secured in heat exchange relationship with the loop conduit 80. The heat exchanger 86 may be used for heating or cooling the water stream within the loop conduit 80. The water-control heat exchanger 86 may be configured and/or operated to transfer thermal energy with the water stream to thereby maintain an optimal temperature of the water passing through the water-control loop 78 to thereby produce a desired temperature and relative humidity of the reactant fuel stream passing through and leaving the separator scrubber 58. The water-control loop 78 also includes a loop conduit return line 90 secured in fluid communication between an outlet 92 of the heat exchanger 86 and a water inlet 94 of the separator scrubber 58 for returning the water stream from the water-control loop 78 back into the separator scrubber 58 through the water discharge 66.

In an alternative embodiment of the integrated contaminant separator and water control loop 10, the water control loop 78 does not include the water-control heat exchanger 86. Instead, a fuel-control heat exchanger 95 is secured in heat exchange relationship with the fuel reactant stream upstream of the separator scrubber 58. For example, and as shown in FIG. 1, the fuel-control heat exchanger 95 may be in heat exchange relationship with the first section 56 of the fuel reactant inlet line 26 between the separator scrubber 58 and the reformer 50. The fuel-control heat exchanger 95 may be utilized to add thermal energy to or to remove thermal energy from the reactant fuel stream to produce a desired temperature of the fuel stream passing through and leaving the separator scrubber 58. This embodiment separates the heat exchange function from the ammonia absorption function, thus providing for more flexibility in design of the packed bed 62 and flow rate of water through the water-control loop 78.

The separator scrubber 58 and water-control loop 78 may also include a controller means 96 for sensing information such as a temperature and/or a moisture content of the fuel reactant stream leaving the scrubber 58 at a scrubber fuel outlet 98. The controller means 96 may be designed for sensing such temperature, water level, and/or moisture information and communicating that information by way of communication lines, such as electric wires, radio transmissions, optical fibers or any signal communication means capable of achieving those functions, such as microprocessors, computers and the like. The sensed information may be utilized by the controller 96 to control the water-control pump 84 and/or the water-control heat exchanger 86, through such communication lines (represented in FIG. 1 by hatched lines 100A, 100B, and 100C) or alternatively to control the fuel-control heat exchanger 95 (communication line thereto not shown). Such controller means 96 may include computers as well as electromechanical switches and/or manual control of the pump 84 and/or heat exchanger 86 in response to observed temperature, water level, and/or moisture information at the scrubber fuel outlet 98. It is known that the solubility of ammonia in water increases with decreasing water temperatures. Therefore, the controller means 96 may be used to adjust the temperature of the water being discharged through the water discharge 66 to adjust the amount of ammonia dissolved into the water, thereby increasing or decreasing the decontamination of the fuel reactant stream.

The scrubber 58 may also include a mist eliminator 102 adjacent the scrubber fuel outlet 98 for eliminating movement of any water droplets along with the fuel reactant stream. The mist eliminator 102 may be any mist eliminator for achieving such a function, such as steel-wool, etc. As shown in FIG. 1, the separator scrubber 58 is configured so that the scrubber fuel outlet 98 is positioned above the ammonia dissolving means 61 and the fuel discharge 60 is positioned below the ammonia dissolving means 61. Therefore, the scrubber fuel outlet 98 directs flow of the fuel reactant stream out of the separator scrubber 58 after it has passed through the ammonia dissolving means 61.

The packed bed 62 may contain any high surface area medium for use in scrubbers for removing contaminants by way of flow of liquid over the surface area of the medium. Examples of such high surface area media that may be used in the packed bed include pall rings, raschig rings, berl saddles, etc. which can be made from metal, ceramic or plastic materials.

The separator scrubber 58 and water-control loop 78 are shown in FIG. 1 as down-stream, between the reformer means and the anode flow field 16 secured to the fuel reactant inlet line 26. It is pointed out however, that the separator scrubber 58 and water-control loop 78 may also be positioned anywhere between a component of the reformer means that generates ammonia or any contaminant and the anode flow field 16 so that some components, such as a low temperature shift converter (not shown), may be secured between the scrubber 58 and the anode flow field 16, depending upon a variety of specific factors for a particular fuel cell 12.

Figure 2:
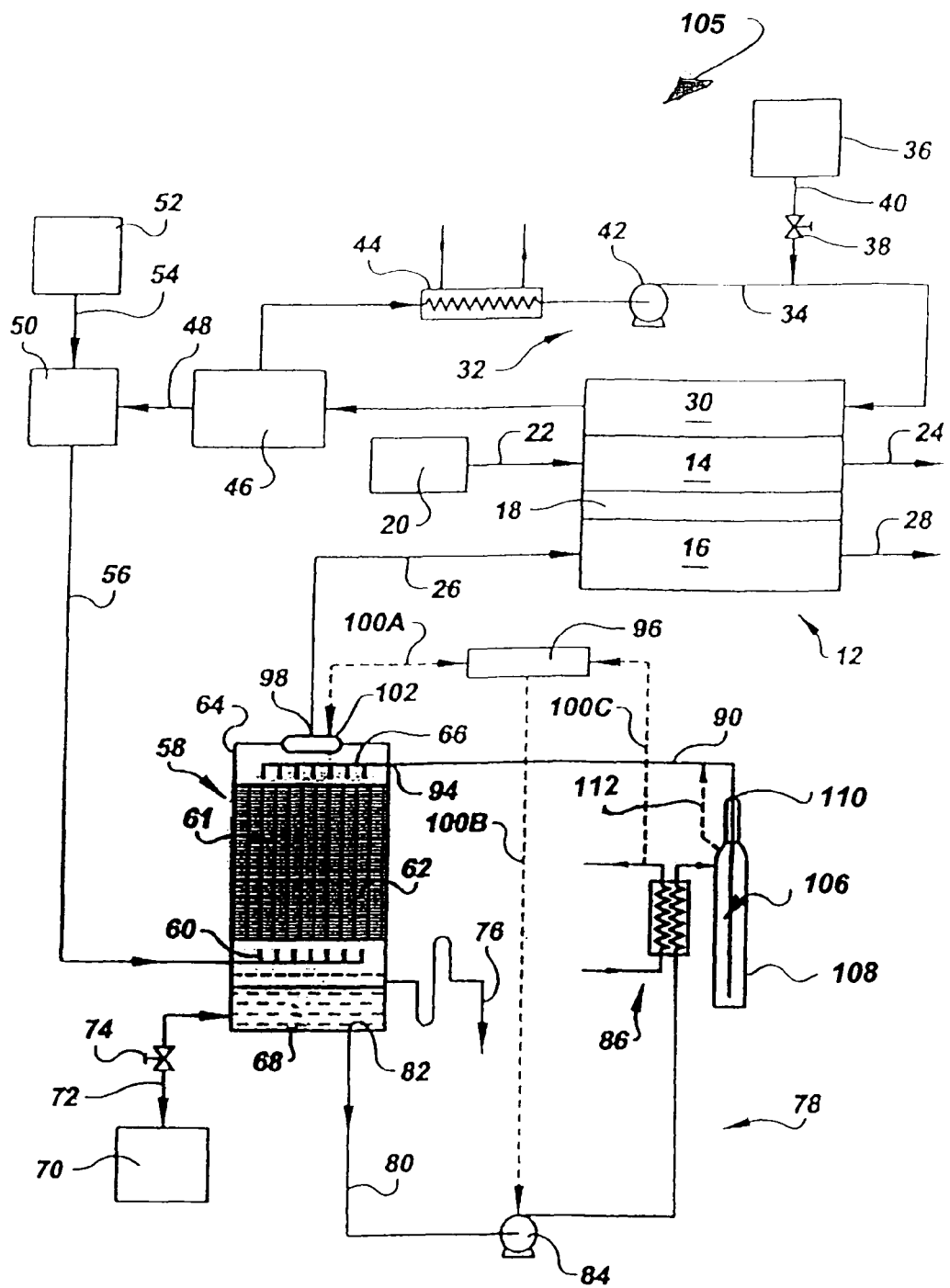
FIG. 2 is a simplified schematic representation of an alternative embodiment of an integrated contaminant separator and water-control loop of the present disclosure.

FIG. 2 shows an alternative embodiment 105 of the present disclosure, wherein ion exchange material is secured as an ion exchange bed 106 within a container 108, such as a bottle, that is secured in fluid communication with the water-control loop conduit 80. (In FIG. 2, components that are virtually identical to the components shown in FIG. 1 are associated with the same reference numerals as those utilized in FIG. 1. For example, the fuel cell 12 of FIG. 1 is shown in FIG. 2 as a fuel cell with reference numeral 12.) In the FIG. 2 embodiment, no particle filter 71 is required, and a separated contaminant stream leaves the accumulator 68 to pass through the loop conduit 80, water-control loop heat exchanger 86 and ion exchange bed 106. The ion exchange bed removes the ammonia ions from the stream, and the separated contaminant stream passes through an ion exchange bed outlet 110 back into the loop conduit 80 to be cycled back into the separator scrubber 58 through the water discharge 66 to again dissolve ammonia as the water passes over surfaces of the packed bed of ammonia dissolving means 61. The FIG. 2 alternative embodiment 105 may also include a gas vent by-pass line 112 in fluid' communication between the ion exchange bed container 108 to provide an escape conduit for any accumulated gasses from the container 108 back into the loop conduit return line 90. Such accumulated gases within the ion exchange bed 106 may disrupt efficient operation of the ion exchange bed 106

By first separating the ammonia or other contaminants within the separator scrubber 58 from the fuel reactant stream within the inlet line 26, the FIG. 1 first embodiment 10 and the FIG. 2 alternative embodiment 105, both embodiments achieve substantial efficiencies over known art. As recited above, maintenance intervals for replacement of the ion exchange material 69 within the accumulator or the ion exchange bed 88 or service thereof to remove contaminants within the accumulator 68 or ion exchange bed 106, may be extended for substantial durations to minimize maintenance costs. In particular, where the ammonia contamination level of a fuel source is known, the ion exchange material 69 or ion exchange bed 106 may be selected to have a contaminant removal capacity such that the accumulator 68 or ion exchange bed 106 may only have to be serviced at a predetermined interval, such as once per year. Additionally, because the contaminant removal process of the present disclosure is essentially a two-step process including first separating out the contaminants from the fuel reactant stream within the scrubber 58 and then isolating and concentrating them within the ion exchange material 69 or ion exchange bed 106 interruption in the flow of the fuel through the packed bed 62 provides only a very modest pressure drop. Because there is such a modest pressure drop, the costs and complexities of delivering the fuel from the fuel supply 52 through the fuel cell 12 are minimized.

The contaminant separator 58 and water-control loop 78 of the present disclosure also include a method of decontaminating a fuel reactant stream for the fuel cell 12. The method includes the steps of flowing the fuel reactant stream adjacent surfaces of a packed bed 62 within a separator scrubber 58 while simultaneously flowing water over the surfaces of the packed bed 62 to separate contaminants from the fuel reactant stream into the water; then accumulating the contaminated water that has flowed over the packed bed 62 within an accumulator 68; then, removing the contaminants from the contaminated stream within an ion exchange material 69 or ion exchange bed 106; circulating the water through a water-control loop 78 from a water outlet 82 of the scrubber into a water discharge 66 within the scrubber 58 to flow over the surface areas of the packed bed 62; and, controlling a temperature of one of the water flowing through the water control loop 78 or the fuel reactant stream flowing through the first section 56 of the fuel reactant stream inlet line 26 secured in fluid communication with the separator scrubber 58 to produce an optimal temperature of the fuel reactant stream passing through the separator scrubber 58. An additional and optional step may include adding an ammonia solubility enhancing reagent to the separated contaminant stream before the step of removing contaminants from the separated contaminant stream within the ion exchange bed 88 step. Any reagents that enhance ammonia solubility and that are compatible with the described integrated contaminant separator and water-control loop 78 would be appropriate, such as an appropriate concentration of phosphoric acid. It is understood that dissolved carbon dioxide, which is a byproduct of the reformation process that makes the hydrogen rich reformate fuel from hydrocarbon fuels, also serves to enhance ammonia solubility in water by formation of carbonic acid in the water.

In an alternative embodiment, the contaminant separator scrubber 58 and water-control loop of the present disclosure may be utilized to remove contaminants from the fuel flowing out of the reformer means 50 for reforming a hydrogen containing fuel into the fuel reactant stream, wherein the fuel reactant inlet line 26 directs the fuel to an alternative hydrogen consuming apparatus (not shown), such as an engine, furnace, etc. In such an embodiment, the disclosure 10 includes the fuel reformer means 50, the ammonia dissolving means 61, the water-control loop 78 and components associated therewith and described above, and the fuel reactant inlet line 26 is configured to direct the fuel out of the contaminant separator 58 and into an alternative fuel consuming apparatus (not shown).

It can be seen that the integrated contaminant separator and water-control loop 10 for a fuel reactant stream of a fuel cell 12 substantially enhances the efficiencies over known apparatus and methods for removing contaminants from a fuel reactant stream. As recited above, by first separating the contaminants from the reactant stream into the separated contaminated water stream and then isolating and concentrating the contaminants within the ion exchange material 69 or ion exchange bed 106, the present disclosure dramatically minimizes the complexities of decontaminating a fuel cell reactant stream. Instead of decontaminating the reactant stream through one large, complex apparatus that must be serviced frequently, the present disclosure permits relatively free flow of the reactant fuel through the scrubber and then concentrates and isolates contaminants. By cycling a water stream through the water-control loop 78 to be de-contaminated within the accumulator 68 and ion exchange material 69 or ion exchange bed 106, and to then pass repeatedly over the packed bed 62, the present disclosure provides an efficient concentration of the isolated contaminants within the ion exchange material 69 or ion exchange bed 106 for periodic removal from the bed at predetermined intervals to thereby minimize overall costs and maintenance requirements.

While the present disclosure has been disclosed with respect to the described and illustrated integrated contaminant separator and water-control loop 10, 105 it is to be understood that the disclosure is not to be limited to those alternatives and described embodiments. For example, while an electrolyte 18 having phosphoric acid is known to be detrimentally affected by ammonia contamination and is therefore a likely form of fuel cell 12 to benefit from this disclosure, the disclosure also will be of substantial advantage to and appropriate for fuel cells with other known electrolytes, especially low temperature proton exchange membrane ("PEM") cells, as well as to other energy consuming apparatus. Accordingly, reference should be made primarily to the following claims rather than the forgoing description to determine the scope of the disclosure.

What is claimed is:

1. A method of decontaminating a fuel reactant stream for a fuel cell (12), comprising the steps of:
   a. flowing the fuel reactant stream through an ammonia dissolving means (61) for dissolving ammonia from the fuel reactant stream within a separator scrubber (58) while simultaneously flowing water through the ammonia dissolving means (61) to separate contaminants from the fuel reactant stream into a separated contaminant water stream;
   b. accumulating the separated contaminant stream from the packed bed within an accumulator (68);
   c. removing contaminants from the separated contaminant water stream onto particles of an ion exchange material (69) integrated within the accumulator (68);
   d. circulating a de-contaminated water stream from the accumulator (68) through a water-control loop (78);
   e. circulating the decontaminated water stream from the water-control loop (78) back through the ammonia dissolving means (61); and,
   f. controlling a temperature of one of the water flowing through the water control loop (78) or the fuel reactant stream upstream of the separator scrubber (58) to produce a predetermined temperature of the fuel reactant stream passing through the separator scrubber (58).

2. The method of claim 1 comprising the further step of adding an ammonia solubility enhancing reagent to the separated contaminant water stream within the separator scrubber (58).

3. The method of claim 1 comprising the further step of replacing the ion exchange material (69) at predetermined time intervals.

4. The method of claim 1 comprising the further step of selecting a volume of the ion exchange material (69) integrated within the accumulator (68) so that the volume of ion exchange material (69) may be replaced at predetermined time intervals.

* * * * *